United States Patent
Hirose

Patent Number: 6,112,459
Date of Patent: Sep. 5, 2000

[54] BOTTOM SOILS AND FILTERING MEDIA FOR REARING FRESH-WATER FISH OR HYDROPONICALLY CULTIVATING PLANTS AND WATER TANKS USING SUCH BOTTOM SOILS AND FILTERING MEDIA

[75] Inventor: Mitsuru Hirose, Chiba, Japan

[73] Assignee: Hirose Co., Ltd., Narashino, Japan

[21] Appl. No.: 09/085,789

[22] Filed: May 28, 1998

[30] Foreign Application Priority Data

Feb. 23, 1998 [JP] Japan ................... 10-082385

[51] Int. Cl.$^7$ .............. A01G 31/00; C05F 11/00
[52] U.S. Cl. ................ 47/59; 71/11; 504/347; 119/246
[58] Field of Search .............. 119/246; 47/59, 47/60, 62 R, 62 A; 71/64.05, 904

[56] References Cited

U.S. PATENT DOCUMENTS

| | | | |
|---|---|---|---|
| 2,306,027 | 12/1942 | Swaney | 47/38 |
| 2,713,749 | 7/1955 | Hult | 47/59 |
| 3,924,570 | 12/1975 | Lamonica | 119/256 |
| 3,933,458 | 1/1976 | Philipp | 71/27 |
| 4,114,316 | 9/1978 | Cohen | 47/64 |
| 4,211,034 | 7/1980 | Piesner | 47/62 E |
| 4,231,187 | 11/1980 | Greenbaum | 47/59 |
| 4,248,617 | 2/1981 | Kamo et al. | 71/42 |
| 4,280,830 | 7/1981 | Ferguson et al. | 71/25 |
| 4,308,065 | 12/1981 | Walls-Muycelo | 501/81 |
| 4,315,381 | 2/1982 | Dvorin | 47/59 |
| 4,329,812 | 5/1982 | Carlisle | 47/59 |
| 4,669,217 | 6/1987 | Fraze | 47/59 |
| 4,754,571 | 7/1988 | Riechmann | 47/59 |
| 4,792,350 | 12/1988 | Loblich et al. | 71/11 |
| 5,019,155 | 5/1991 | Kimpara et al. | 504/347 |
| 5,056,260 | 10/1991 | Sutton | 47/59 |
| 5,067,275 | 11/1991 | Constance | 47/62 |
| 5,099,605 | 3/1992 | Moffet, Jr. | 47/59 |
| 5,125,951 | 6/1992 | Lahoda et al. | 71/12 |
| 5,127,366 | 7/1992 | Kim | 119/246 |
| 5,433,923 | 7/1995 | Wolverton et al. | 47/59 |
| 5,458,877 | 10/1995 | Obayashi et al. | 47/59 |
| 5,471,786 | 12/1995 | Clausen | 47/59 |
| 5,489,323 | 2/1996 | Yoshida | 47/59 |
| 5,640,929 | 6/1997 | Malone | 119/248 |
| 5,921,024 | 7/1999 | Minoji | 47/62 R |

FOREIGN PATENT DOCUMENTS 2167010  6/1990  Jordan ................ 47/59 CO

*Primary Examiner*—Robert P. Swiatek
*Assistant Examiner*—Son T. Nguyen
*Attorney, Agent, or Firm*—Burgess, Ryan & Wayne

[57] ABSTRACT

It has been known that water having a pH value of 5.5 to 7.5 is suited for the rearing of fresh-water fish and hydroponic cultivation of plants. Bottom soils or filtering media prepared by mixing carbonates of alkali metals or alkali-earth metals with volcano-ash-base soils and sintering the mixture into granules. When used in water tanks or reservoirs for fish rearing or hydroponic cultivation, the bottom soils or filtering media thus prepared provide favorable environments for such rearing and cultivation.

2 Claims, 3 Drawing Sheets

1 or 2

BOTTOM SOILS AND FILTERING MEDIA FOR REARING FRESH-WATER FISH OR HYDROPONICALLY CULTIVATING PLANTS AND WATER TANKS USING SUCH BOTTOM SOILS AND FILTERING MEDIA

BACKGROUND OF THE INVENTION

1) Field of the Invention

This invention relates to bottom soils and filtering media that permits maintaining appropriate pH values during the rearing of fresh-water fish or hydroponic cultivation of plants and water tanks using such bottom soils and filtering media.

2) Background Art

During the rearing of fresh-water fish or hydroponic cultivation of vegetables, rice and other plants, it is necessary to maintain the pH value of water necessary for them within appropriate limits.

Fish are reared in various ways, such as breeding, fry raising, fattening, and keeping tropical fish. Hydroponic cultivation is done by, for example, burying cut pieces of stems or plant roots in the bottom soil under water. All of these are not done in systems where water is constantly supplied or discharged. They are performed in closed systems having water tanks or semi-closed systems where water is supplied from an external supply source and discharged as required.

When fish rearing and hydroponic cultivation are done in such closed or semi-closed systems, pH is likely to vary because water is changed infrequently.

In fish rearing, breathing and excretion of fish tend to make water increasingly acidic.

More specifically, carbon dioxide generated by breathing makes water acidic. Waste matters excreted naturally contain ammonia that is turned into nitric acid, by the action of microorganisms, that, in turn, makes acidic the water in the tank.

In the hydroponic cultivation in the aforementioned environments, physiological actions involving the excretion of acid materials from roots make water acidic. On the other hand, absorption of carbon dioxide through photosynthesis in water makes water alkaline, and absorption of mineral nutrition makes water acidic or alkaline. Thus, water becomes either acidic or alkaline depending on the level of these processes.

Suitable ranges of pH values for most fish rearing and hydroponic cultivation processes are known, whereas not much study has been made as to the compositions of bottom soils and filtering media for keeping appropriate pH values.

The object of this invention is to provide bottom soils and filtering media to keep appropriate pH values for fish rearing and hydroponic cultivation, water tanks using such bottom soils and filtering media, and methods of fish rearing and hydroponic cultivation using such bottom soils and filtering media.

SUMMARY OF THE INVENTION

It has been known that pH values between 5.5 and 7.5 are suited for freshwater fish in most regions other some special ones.

The range of pH values suited for most hydroponic cultivation processes is also between 5.5 and 7.5, as in the case of fish rearing.

Based on this fact, the bottom soils and filtering media according to this invention that maintains the pH value of water in the tank or reservoir within the required stable range comprise granules of volcanic-ash-base soils mixed with carbonates of alkali metals or alkali-earth metals and sintered.

DETAILED DESCRIPTION OF THE INVENTION

Fish reared in tanks containing weak alkaline or weak acidic water whose pH values are between 5.5 and 7.5 live longer and are less susceptible to diseases than other fish that are reared under conditions similar in other respects, such as feeding and air changing.

Thus, pH values in the above range are considered to be favorable for fish rearing.

Similarly, hydroponically cultivated plants grow more rapidly in water whose pH values are within the same range than other plants that are cultivated under conditions similar in other respects, such as fertilizing and water changing.

It is thus empirically considered that water whose pH values are within the above range is favorable for hydroponic cultivation.

The pH value of water for fish rearing and hydroponic cultivation can be maintained constant by frequently changing water in the water tank or reservoir. However, frequent changing is troublesome.

By contrast, bottom soils and filtering media prepared by sintering into granules mixtures of volcanic-ash-base soils with carbonates of alkali metals or alkali-earth metals permit keeping the pH value of water in the tank or reservoir in the desired range over a long period of time.

The reason why carbonates of alkali metals or alkali-earth metals are selected is as follows: If hydrates of alkali metals or alkali-earth metals (such as NaOH and $Ca(OH)_2$) are used, alkali-metal or alkali-earth-metal ions (such as Na+ and $Ca^{2}+$) and hydroxide ions ($OH^{31}$) quickly dissolve in water, whereupon water in the tank temporarily becomes too alkaline to allow satisfactory fish rearing or hydroponic cultivation. By comparison, carbonates of alkali metals or alkali-earth metals (such as $Na_2CO_3$ and $CaCO_3$) do not quickly dissolve in water as ions. In water containing carbon (as $CO_2$), they dissolve as hydrogen carbonates (such as $NaHCO_3$ and $Ca(HCO_3)_2$) and the carbon in water prevents oxidation by carbonic acid ($H_2CO_3$).

Sintered granules of volcanic-ash-base soils are used as the material of bottom soils and filtering media. Volcanic-ash-base soils generally containing sulfate are porous but retain adequate hardness when granulated. Thus, sulfuric acid contained therein gradually dissolves into water and performs a cushioning function to avoid a rapid increase in the pH value that might otherwise occur when carbonates of alkali metals or alkali-earth metals dissolve.

The relative quantity of carbonates of alkali metals or alkali-earth metals in volcanic-ash-base soils differs depending on the type of water tank or reservoir and whether they are used as bottom soils or filtering media. To attain adequate neutralizing and cushioning functions, it has empirically been known that appropriate contents are between 0.2 and 1.5 percent by weight for carbonates of alkali metals and between 0.5 and 2.5 percent by weight for alkali-earth metals.

Figure 1:
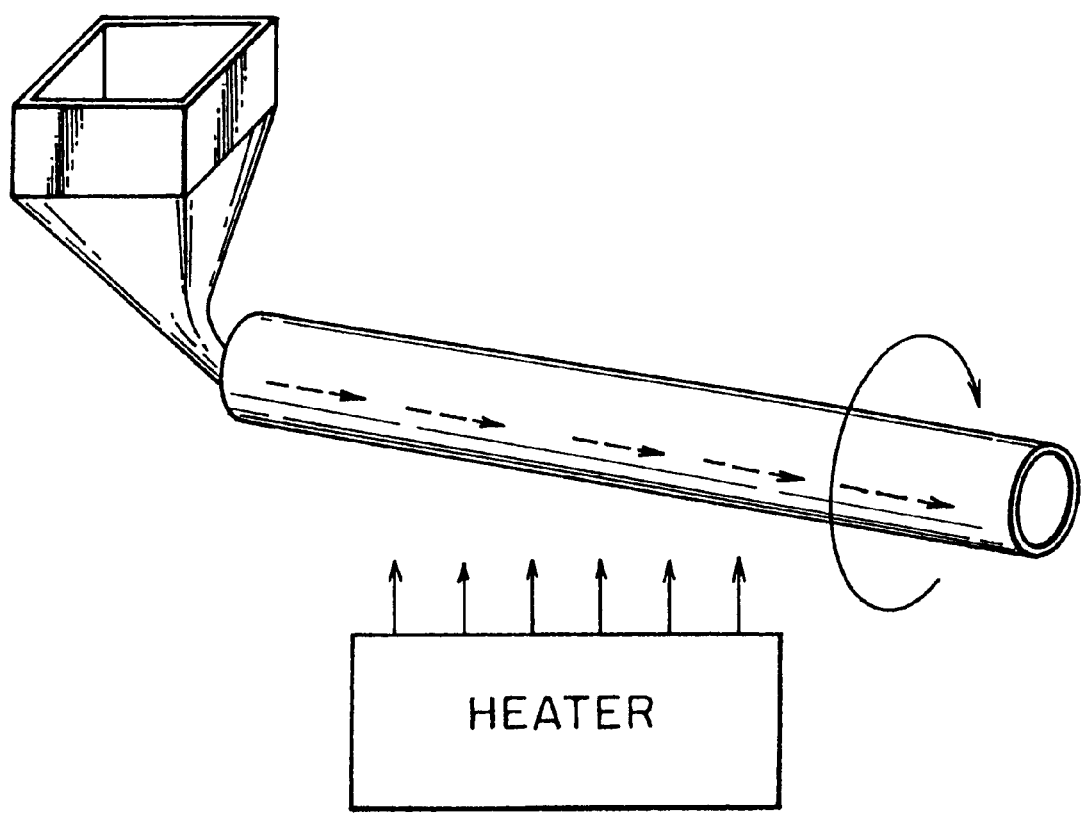
FIG. 1 is a schematic illustration of the basic construction of this invention.

Now a method of preparing the bottom soils and filtering media according to this invention is described below. A muddy mixture of volcanic-ash-base soil and carbonate of an alkali metal or alkali-earth metal prepared by adding water is continuously filled into a rotating pipe 5 of heat-resisting material from a hopper 6 and allowed to fall under gravity while the pipe is heated by a burner or other suitable device, as shown in FIG. 1. Then, a material suited for bottom soils or filtering media is obtained.

In the sintering process described above, the muddy mixture gradually loses moisture and becomes granulated while descending through the pipe. Heating need not be continued until moisture is completely removed. The product retaining some moisture is taken out from the rotating pipe.

To ensure the gradual evaporation and granulation described above, the appropriate heating temperature is between 200 and 100° C. Particularly when the material is removed from the heat-resisting pipe, it is preferable to heat at 100° C. or thereabout near the lower limit of the above temperature range to ensure proper moisture control.

Some moisture retained in the product as mentioned above is approximately 0.5 to 1.5 percent by weight. If sintering is continued beyond this point, thus allowing further removal of moisture, the product becomes pulverized. If heating is discontinued while too much moisture remains unremoved, the product lacks adhesive strength required for remaining granular in water.

Some examples are described below.

EXAMPLES

Experiment 1

Three freshwater tropical fish were reared in a water tank containing 8 kg of red volcano-ash-base soil as bottom soil, 50 liters of tap water having a pH value of 7.4 and two water grasses. The pH value of the water decreased from 7.4 to approximately 4.8 in 96 hours (4 days).

Figure 2:
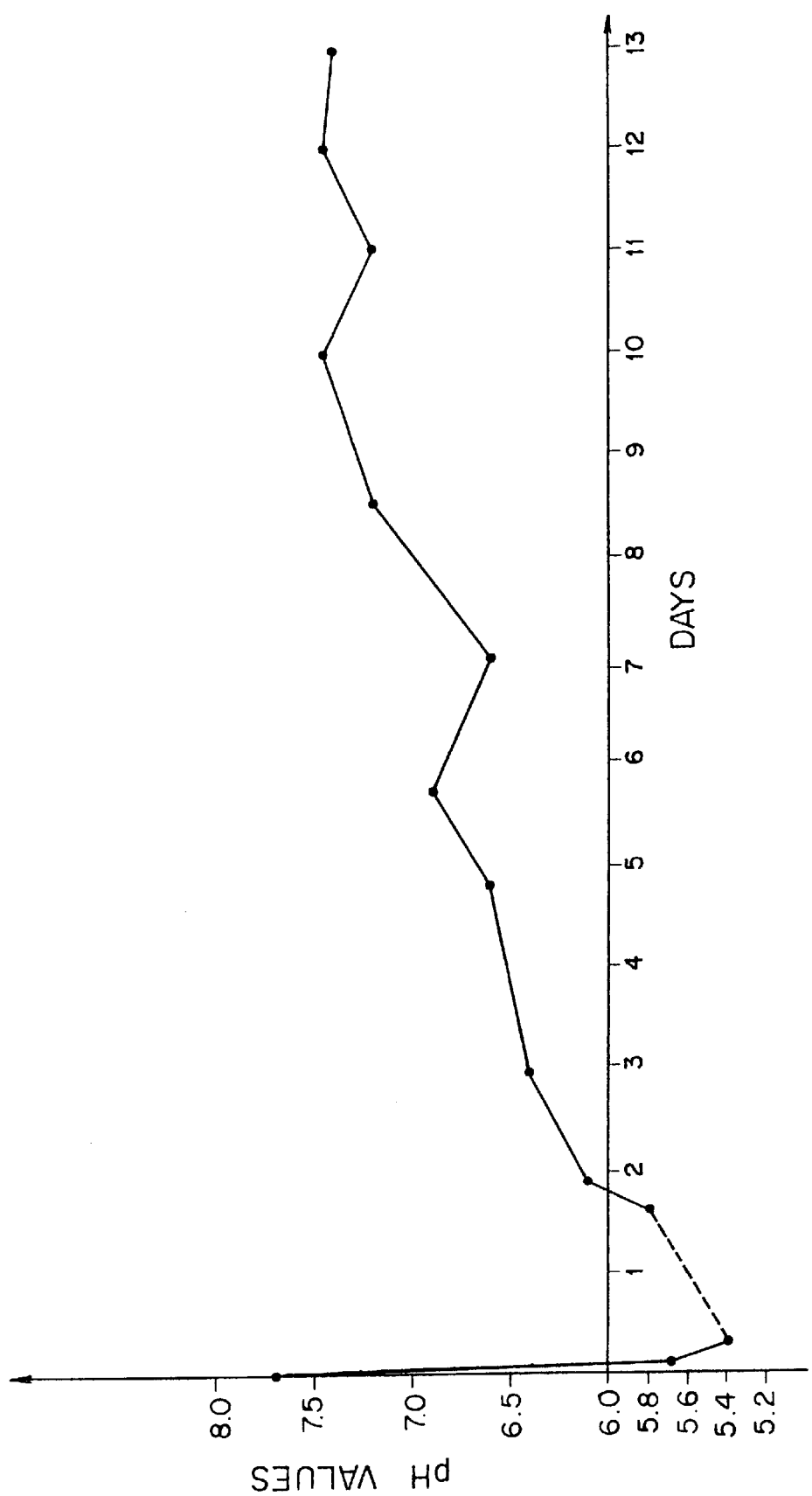
FIG. 2 graphically shows the effects of the bottom soil obtained in Experiment 1.

Another tank tested contained 8 kg of the same red volcano-ash-base soil granulated by sintering at approximately 200° C. as bottom soil, 80 g of calcium carbonate ($CaCO_3$) and 50 liters of well water having a pH value of 7.6, other conditions being the same as in the above tank. The pH value in the tank changed for the first 10 days. After then, the pH value remained constant at approximately 7.2 for a period of approximately 20 days, as shown in FIG. 2.

The tropical fish reared in the water having these pH values remained healthy without catching any disease.

The pH value of water in a tank containing 8 kg of the same sintered granular red volcano-ash-base soil and 60 g of calcium carbonate ($CaCO_3$) became stable at 6.8 to 6.9 after 3 to 5 days and remained in the same state for approximately 20 days.

In another tank containing 8 kg of the same sintered granular red volcano-ash-base soil and 50 g of calcium carbonate ($CaCO_3$), 80 percent of the total water was replaced with tap water having a pH value of 7.5 to 8.0 at one week intervals. Then, the pH value remained stable at 5±0.5 for over 30 weeks. When 80 percent of the total water in the same tank was replaced with well water having a pH value of 5.0 to 5.5, the pH value remained stable at 6.5±0.5 for approximately 31 weeks.

Example 2

Three freshwater tropical fish were reared in the same water tank that was used in Experiment 1 but containing 7 kg of black volcano-ash-base soil as bottom soil, 1 kg of the same black volcano-ash-base as filtering media, and 50 liters of tap water having a pH value of 7.6. The pH value of the water decreased from 7.6 to approximately 5.2 in 96 hours (4 days).

Then, 8 kg of the same black volcano-ash-base soil was sintered at approximately 300° C., granulated and mixed with 30 g of magnesium carbonate. Another tank tested contained 7 kg of this sintered and granulated mixture as bottom soil, 1 kg of the same mixture as filtering media, and 50 liters of tap water having a pH value of 7.6. The pH value in the tank changed for the first 5 days. After then, the pH value remained constant at approximately 6.2 to 6.8 for a period of 18 days.

When 40 g of magnesium carbonate was mixed with 7 kg of bottom soil and 1 kg of filtering media comprising the sintered and granulated volcano-ash-base soil mentioned above, the pH value became stable at 6.6 to 7.0 after approximately 5 days and remained in the same state for 14 days (2 weeks).

Example 3

Two goldfish were reared in the same tank that was used in Experiment 1, containing a red soil sintered at 300° C. as bottom soil and two water grasses. To this tank, 10 g each of sodium carbonate ($Na_2CO_3$) and potassium carbonate ($K_2CO_3$) and 50 liters of tap water having a pH value of 7.5 were added. Then, the pH value became stable at 6.9 in approximately 9 days, as shown in FIG. 3-1.

When 80 percent (40 liters) of the water in the same tank containing the same bottom soil was replaced with well water having a pH value of 5.0 to 5.5, the pH value became stable at the value mentioned above for approximately 31 weeks.

Example 4

Figure 3:
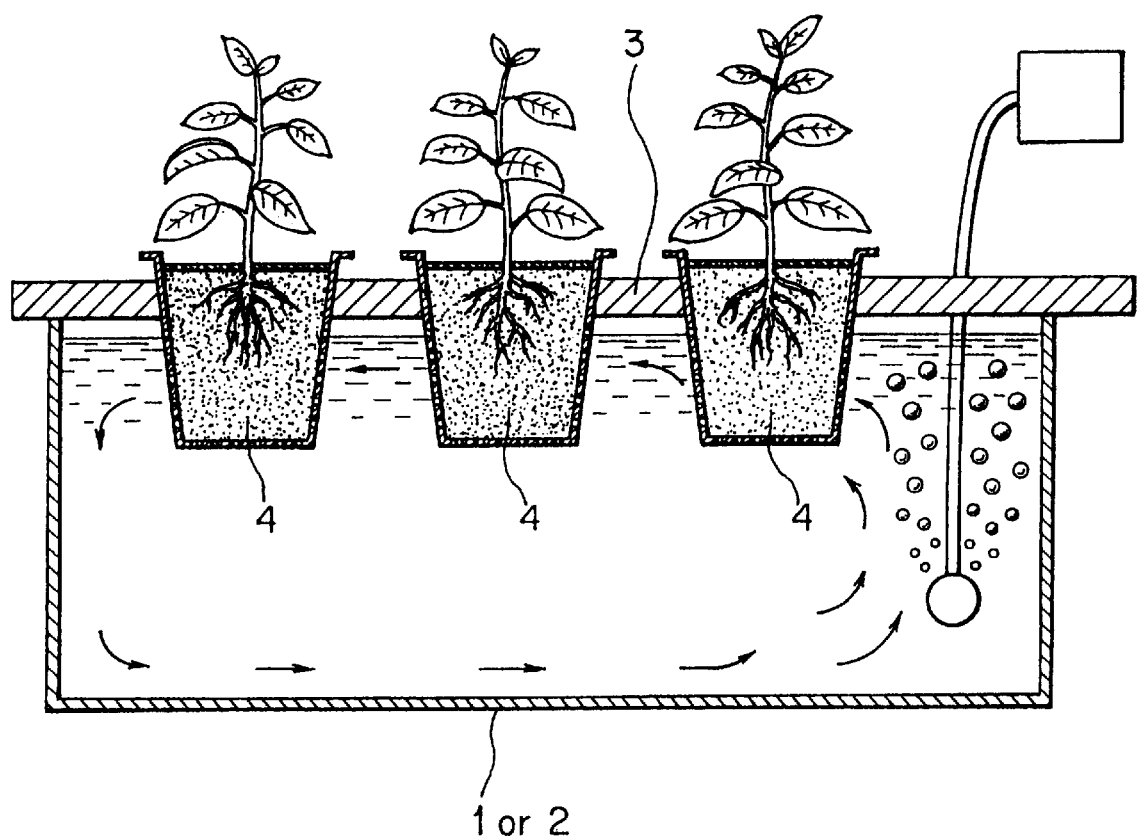
FIG. 3 is a side elevation showing a test to evaluate the effect of the bottom soil obtained in Experiment 2.

Plastic pots 4 as shown in FIG. 3 were fit in three holes in a support frame of polystyrene foam 3 provided in each of two water tanks (having a rectangular bottom of 60 cm by 30 cm and a height of 26 cm) 1 and 2. Then, parsley, watercress and primula polyantha were hydroponically cultivated using the tanks 1 and 2 as shown in FIG. 3.

The plastic pots 4 in the tank 1 were filled with a bottom soil according to this invention prepared by sintering and granulating a mixture of volcano-base soil and calcium carbonate and the water in the tank was circulated. Then, the pH value was kept at 7.6.

The plastic pots in the tank were filled with rock wool and the water in the tank was circulated as in the case of the tank 1.

Hydroponic cultivation of the three plants was continued for 60 days, between Sep. 20 and Nov. 19, 1997, in a vinyl-covered greenhouse in which the tanks containing the plastic pots were placed.

The total weights of the three plants, excluding their roots, before the start of hydroponic cultivation and 60 days after that were as shown in the following table.

|  | Tank 1 | | Tank 2 | |
| --- | --- | --- | --- | --- |
| Tested Plants | Weight at starting | Weight after 60 days | Weight at starting | Weight after 60 days |
| Parsley | 4.8 g | 49.2 g | 4.5 g | 40.7 g |
| Watercress | 5.3 g | 60.0 g | 6.5 g | 44.4 g |
| Primula Polyantha | 3.2 g | 26.8 g | 4.1 g | 22.1 g |

As is obvious from the above results, the plants hydroponically cultivated in the tank 1 with the bottom soil according to this invention weighed heavier than those in the tank 2. This shows that the former grew more than the latter.

The results of the experiments show that the soils according to this invention have properties equivalent to, or better than, those of rock wool popularly used as the culture medium for hydroponic cultivation.

EFFECT OF THE INVENTION

As can be seen from the results of the experiments described above, this invention permits maintaining the pH value of water in tanks or reservoirs at a constant level for a long time by using simple materials, such as volcanic-ash-base soils and carbonates of alkali metals, such as sodium carbonate, or carbonates of alkali-earth metals, such as calcium carbonate.

The sulfuric acid contained in the soils of this invention plays an important role to remove ammonia that is excreted by fish and detrimental to the rearing of fish because the contained sulfuric acid dissolves into water and changes the excreted ammonia into nitric acid.

Furthermore, the porous and granular bottom soils and filtering media according to this invention have greater contact areas with water than conventional ones, thereby providing favorable sites for the growth of nitrifying bacteria and other useful bacteria necessary for the hydroponic cultivation of plants.

As is obvious from the above, the soils and filtering media according to this invention bring about an epochal effect in the rearing of fish and hydroponic cultivation of plants in adverse environments, such as water tanks and reservoirs, where satisfactory supply and discharge of water are difficult to achieve.

What is claimed is:

1. A bottom soil or a filtering medium for use in a water tank or a reservoir comprising a medium prepared by mixing a carbonate of an alkali-earth metal with a volcanic-ash based soil wherein the bottom soil or filtering medium is prepared by mixing the carbonate of the alkali metal or alkali-earth metal with the volcanic-ash based soil, passing the mixture through a tilted heated rotating pipe and discharging granules of the mixture containing about 0.5 to about 1.5% by weight of moisture and wherein the bottom soil or filtering medium for use in fish rearing or hydroponic cultivation and wherein the granules of the mixture are discharged from the rotating pipe at a temperature of about 100 C. and sintering the mixture to form granules.

2. The bottom soil or filtering medium of claim 1 wherein the mixture is sintered by passing through a rotating pipe heated to a temperature of from about 100 C. to about 200 C.

* * * * *